US012188512B2

(12) United States Patent
Southwood et al.

(10) Patent No.: US 12,188,512 B2
(45) Date of Patent: Jan. 7, 2025

(54) DECORATIVE SECURITY FASTENER (71) Applicant: MACLEAN-FOGG COMPANY, Mundelein, IL (US)

(72) Inventors: Bradley Warren Southwood, Mundelein, IL (US); Mark Andrew Raves, Mundelein, IL (US); Luke Michael Roberts, Mundelein (IL); Eric McFarlane, Mundelein, IL (US); Joseph Verla, Mundelein, IL (US)

(73) Assignee: MacLean-Fogg Company, Mundelein, IL (US)

(*) Notice: Subject to any disclaimer, the term of this patent is extended or adjusted under 35 U.S.C. 154(b) by 82 days.

(21) Appl. No.: 17/787,547

(22) PCT Filed: Dec. 18, 2020

(86) PCT No.: PCT/US2020/066090
§ 371 (c)(1),
(2) Date: Jun. 20, 2022

(87) PCT Pub. No.: WO2021/127490
PCT Pub. Date: Jun. 24, 2021

(65) Prior Publication Data
US 2022/0381285 A1 Dec. 1, 2022

Related U.S. Application Data (60) Provisional application No. 62/950,096, filed on Dec. 18, 2019.

(51) Int. Cl.
F16B 37/14 (2006.01)
B60B 3/16 (2006.01)
F16B 23/00 (2006.01)

(52) U.S. Cl.
CPC .............. F16B 37/14 (2013.01); B60B 3/165 (2013.01); F16B 23/0007 (2013.01); B60B 2900/3318 (2013.01)

(58) Field of Classification Search
CPC .............. F16B 23/0007; F16B 23/0061; F16B 23/0069; F16B 23/0076; F16B 31/02;
(Continued)

(56) References Cited

U.S. PATENT DOCUMENTS 2,850,937 A 9/1958 Ralston
3,222,976 A 12/1965 Holman
(Continued)

OTHER PUBLICATIONS

International Search Report and Written Opinion for Application No. PCT/US2020/066090, dated Mar. 18, 2021, 16 Pages.
(Continued)

*Primary Examiner* — Roberta S Delisle
(74) *Attorney, Agent, or Firm* — Brooks Kushman P.C.

(57) ABSTRACT

A security fastener assembly is provided with a cap having a standard tool bearing surface and an attachment portion formed opposite the tool bearing surface. A fastener body has a mating attachment portion formed at a first end along which the cap is secured and a keyed security feature formed adjacent the mating attachment portion. A second end of the fastener body has a threaded fastener portion for securing the fastener assembly to a vehicle. The threaded portion of the fastener body is installed with rotation in a first direction. Engaging the tool bearing surface of the cap and rotating in a second direction opposite the first direction does not rotate the threaded portion of the fastener body. The fastener body is removable with the keyed security feature.

20 Claims, 7 Drawing Sheets (58) Field of Classification Search
CPC ........ F16B 37/14; F16B 41/005; F16B 34/14; B60B 3/165; B60B 2900/3318; Y10S 411/91
USPC .......................... 411/372.5, 372.6, 373, 374
See application file for complete search history.

(56) References Cited

U.S. PATENT DOCUMENTS

| | | | | |
|---|---|---|---|---|
| 3,930,428 | A * | 1/1976 | Hale | ..................... B25B 13/485 |
| | | | | 411/910 |
| 4,616,535 | A | 10/1986 | Chiavon | |
| 4,710,082 | A | 12/1987 | Curtis | |
| 4,824,305 | A * | 4/1989 | McCauley | ................ B60B 7/00 |
| | | | | 411/908 |
| 4,968,202 | A | 11/1990 | Lanham | |
| 5,180,266 | A * | 1/1993 | Nolan | ..................... F16B 37/14 |
| | | | | 411/374 |
| 5,302,069 | A * | 4/1994 | Toth | ........................ F16B 37/14 |
| | | | | 411/429 |
| 5,380,070 | A * | 1/1995 | FitzGerald | ................ B60B 7/00 |
| | | | | 411/374 |
| 6,719,511 | B2 * | 4/2004 | Notaro | .................. F16B 41/005 |
| | | | | 411/432 |
| 9,765,807 | B1 * | 9/2017 | Watts | .................. F16B 23/0007 |
| 2013/0007120 | A1 | 1/2013 | Teifke | |
| 2014/0169910 | A1 * | 6/2014 | Winnie | ................... F16B 39/12 |
| | | | | 411/222 |
| 2014/0363255 | A1 * | 12/2014 | Kishida | ................ F16B 5/0275 |
| | | | | 411/372.6 |
| 2016/0032959 | A1 * | 2/2016 | Cadena | .................. B60B 3/165 |
| | | | | 411/110 |

OTHER PUBLICATIONS

International Preliminary Report on Patentability for Application No. PCT/US2020/066090, dated Jun. 30, 2022, 10 Pages.

* cited by examiner

DECORATIVE SECURITY FASTENER

CROSS-REFERENCE TO RELATED APPLICATION

This application is the U.S. national phase of PCT Application No. PCT/US2020/066090 filed Dec. 18, 2020, which claims the benefit of U.S. provisional application Ser. No. 62/950,096 filed Dec. 18, 2019, the disclosures of which are hereby incorporated in their entirety by reference herein.

TECHNICAL FIELD

The present application relates to vehicle wheel fasteners.

BACKGROUND

Vehicle wheels are sometimes stolen for resale or scrap value. To prevent wheels from being stolen, a locking fastener may be used in the place of one of the standard wheel fasteners to "lock" the wheel to the vehicle and prevent removal of the fastener. These locking fasteners have a different appearance than the other decorative wheel fasteners on the same wheel and can be unattractive.

SUMMARY

According to one embodiment, a security fastener assembly is provided with a cap having a standard tool bearing surface and an attachment portion formed opposite the tool bearing surface. A fastener body has a mating attachment portion formed at a first end along which the cap is secured and a keyed security feature formed adjacent the mating attachment portion. A second end of the fastener body has a threaded fastener portion for securing the fastener assembly to a vehicle. The threaded portion of the fastener body is installed with rotation in a first direction. Engaging the tool bearing surface of the cap and rotating in a second direction opposite the first direction does not rotate the threaded portion of the fastener body. The fastener body is removable with the keyed security feature.

In another embodiment, the keyed security feature is concealed by the cap when the cap is attached to the fastener body.

In another embodiment, the cap is removable from the fastener body without unseating the fastener body from the vehicle.

In another embodiment, the assembly is configured to be threadedly secured to the vehicle with a standard tool contacting the tool bearing surface of the cap and rotation of the cap and fastener body in a first direction.

In another embodiment, the attachment portion of the cap comprises a threaded portion and the fastener body has a mating threaded portion. The cap is rotated in a first direction to engage the threaded portion with the mating threaded portion on the fastener body. Rotation of the cap in a second direction opposite the first direction removes the cap from the fastener body, but does not rotate the fastener body in the second direction.

In another embodiment, the fastener body has a first thread dimension of the mating threaded portion being different than a second thread dimension of the threaded fastener portion. A first break-away torque between the cap and the fastener body based on the first thread dimension is less than the break-away torque between the fastener body and the vehicle based on the second thread dimension.

In another embodiment, the first thread dimension has first helix angle being different than a second helix angle of the second thread dimension. A first break-away torque between the cap and the fastener body is less than the second break-away torque between the fastener body and the vehicle.

In another embodiment, at least one of the threaded portion on the cap or the mating threaded portion on the fastener body has a friction modifier coating to reduce the first break-away torque between the cap and the fastener body.

In another embodiment, the attachment portion of the cap comprises an internal bore and wherein the mating attachment portion on the fastener body has a protrusion, wherein the protrusion is pushed into the internal bore so the cap is retained on the fastener body with an interference fit.

In another embodiment, the mating attachment portion further comprises at least one elastomeric ring. The elastomeric ring is compressed upon insertion into the bore so the cap is retained on the fastener body with an interference fit.

In another embodiment, the internal bore has an annular ridge, the elastomeric ring engages the annular ridge with a snap-lit.

In another embodiment, a cap body is formed of plastic. The internal bore elastically deforms as the mating attachment portion is pushed into the bore so the cap is retained on the fastener body with an interference fit.

In another embodiment, the protrusion has an annular rib. The internal bore has a first opening being less than a second opening. The first opening portion elastically deforms as the annular rib is pushed into the bore so the cap is retained on the fastener body with a snap fit.

In another embodiment, the cap freely spins about the protrusion while the cap is retained on the fastener body.

In another embodiment, the keyed security feature has at least one recess having a unique security shape being inoperable with standard tools.

In another embodiment, the keyed security feature is formed internal to the mating attachment portion on the fastener body.

In another embodiment, the keyed security feature is formed external to the mating attachment portion on the fastener body.

In another embodiment, a security fastener kit has security fastener assembly of claim 1 and a security drive tool having a tool bearing tip shaped to engage the keyed security feature for removing the fastener body from the vehicle.

According to another embodiment, a security fastener assembly is provided. The security fastener assembly is a two-piece assembly having a separable cap and fastener body. The cap has a standard tool wrenching surface and a threaded attachment portion formed opposite the tool wrenching surface. The fastener body has a mating threaded attachment portion formed at a first end along which the cap is secured, and a keyed security feature formed adjacent the mating attachment portion. A second end of the fastener body has a threaded engagement portion for securing the fastener assembly to a vehicle. The fastener body has a first thread dimension of the mating threaded portion being different than a second thread dimension of the threaded engagement portion, first break-away torque between the cap and the fastener body is based on the first thread dimension and is less than a second break-away torque between the fastener body and the vehicle based on the second thread dimension. The threaded portion of the fastener body is installed with rotation in a first direction, and engaging the tool bearing surface of the cap and rotating in a second direction opposite the first direction does not rotate the threaded portion of the fastener body. The fastener body is removable with the keyed security feature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
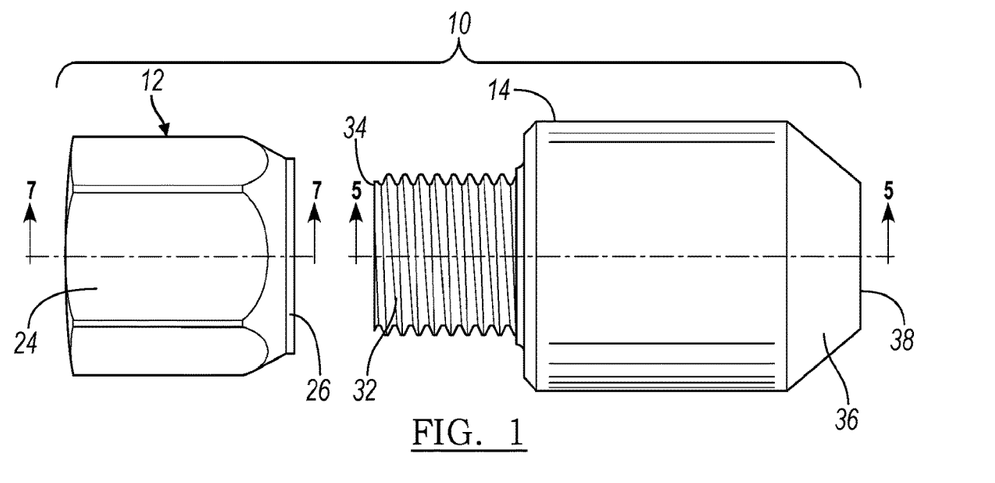
FIG. 1 is an exploded perspective view of a security fastener assembly having a decorative cap and a fastener body according to one embodiment.

FIG. 1 illustrates a decorative security fastener assembly 10. The decorative security fastener assembly 10 includes a decorative fastener cap 12 coupled to a security fastener body 14. The decorative security fastener assembly 10 can installs with standard tools but requires a specific keyed tool to remove.

Figure 6:
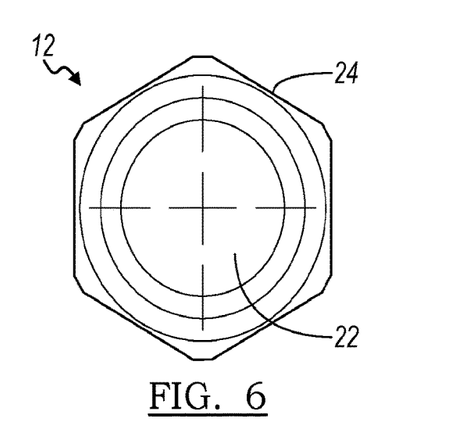
FIG. 6 is a bottom view of a cap of the fastener assembly in FIG. 1.
Figure 7:
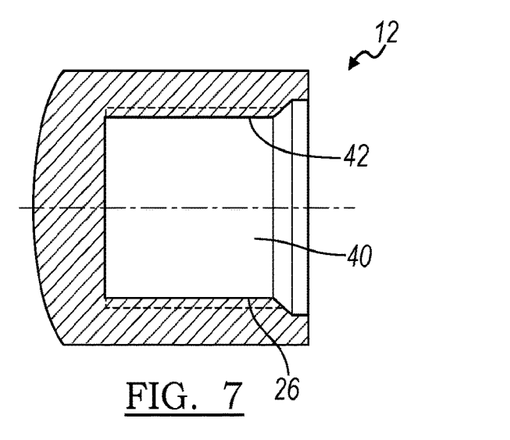
FIG. 7 is a section view of the cap through section lines 7-7 in FIG. 1.

As shown in FIG. 6, the decorative fastener cap 12 may have a hexagonal bearing surface 24. The fastener cap 12 has a bearing surface 24 being common with the other wheel fasteners on the vehicle. As such, the security fastener 10 may be installed with a standard tool and does not need a special or unique tool to be installed. The cap 12 may have six bearing surfaces oriented in a hexagonal shape. However, it is possible for the cap 12 to have a different number of wrenching surfaces or, any suitable shape, configuration or standard of tool bearing surface may be used. For example, a fastener cap having a three-pointed tool bearing surface may be used, such as U.S. patent application Ser. No. 15/487,805 by Larry Wilson et al., or a hybrid bearing surface, such as in U.S. patent application Ser. No. 15/872,386 by Steven Tomaszewski et al., the disclosures of which are hereby incorporated by reference herein.

The fastener cap 12 has an attachment portion 26 for attaching the cap 12 to the fastener body 14. The attachment portion 26 is formed opposite the tool bearing surface 24 for attaching the cap 12 to a mating attachment portion 32 on the fastener body 14.

As illustrated in the embodiment in FIG. 1, the attachment portion 26 includes a threaded surface 16. The threaded surface 16 is formed as internal threads 42 formed in a bore 28 opposite an enclosed cap end 22. The internal threads 42 on the threaded portion 16 threadedly engage external threads 44 on the fastener body 14. When the internal threads 42 are fully seated on the external threads 44 of the fastener body 14, the cap 12 provides a flow path for torque to the fastener body 14 so the security fastener assembly 10 can be fastened to a vehicle wheel stud (not shown) at industry standard torque levels in order to securely fasten the wheel to the vehicle.

The mating attachment portion 32 has external threads 44 formed at a first end 34 of the fastener body 14. A tapered, frustoconical, spherical or other shaped bearing surface 36 is formed at a second end 38 of the fastener body opposite the first end 34. In one example, the bearing surface 36 may be tapered at 60-degrees. The bearing surface may be tapered at other suitable taper dimensions such as 45-degrees, in another example. The second end 38 has an internal bore 40 having internal threads 48 to engage the wheel stud on the vehicle. When the internal threads 48 are fully seated on the stud at standard torque levels, the bearing surface 36 is compressed and in tension with a corresponding surface to reduce the tendency for the nut to loosen, thereby maintaining the wheel securely to the vehicle.

Figure 5:
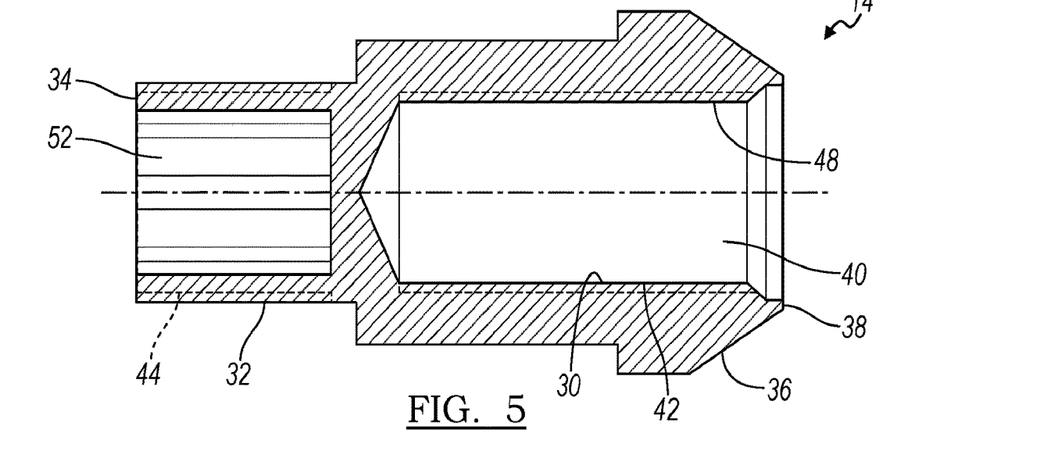
FIG. 5 is a section view of the fastener body through section lines 5-5 in FIG. 1.
Figure 8:
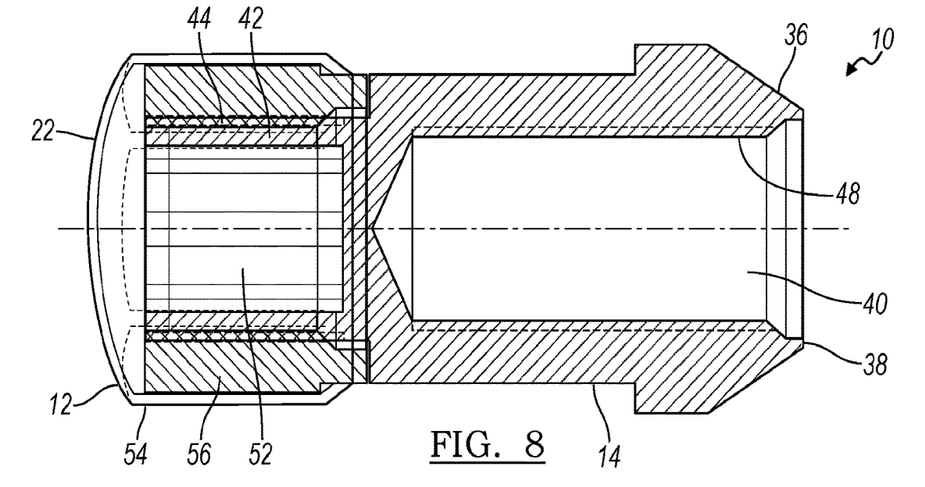
FIG. 8 is a section view of the fastener assembly through section lines 8-8 in FIG. 2.

As shown in the cross-section views in FIG. 5 and FIG. 8, the second end 38 of the fastener body 14 is formed as a nut body having an engagement surface 30 with internal threads 48. In another embodiment, the second end 38 of the fastener body 14 may be formed as a bolt having and engagement surface with external threads to engage a threaded hole in the wheel's hub, drum brake or disc.

If the fastener assembly 10 is tried to be, the fastener cap 12 will rotate and unthread from the fastener body 14 revealing a keyed security feature 50. Once the fastener cap 12 is removed a matching keyed security tool is required to remove the fastener body 14 from the wheel stud.

Figure 2:
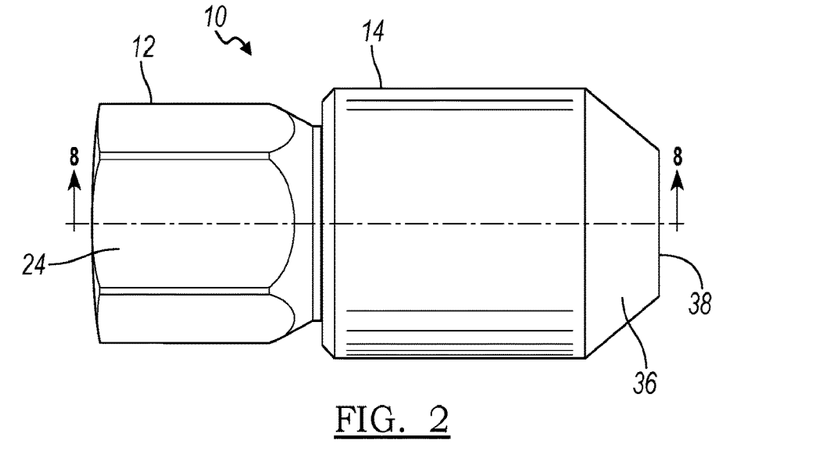
FIG. 2 is an assembled perspective view of the security fastener assembly of FIG. 1.
Figure 3:
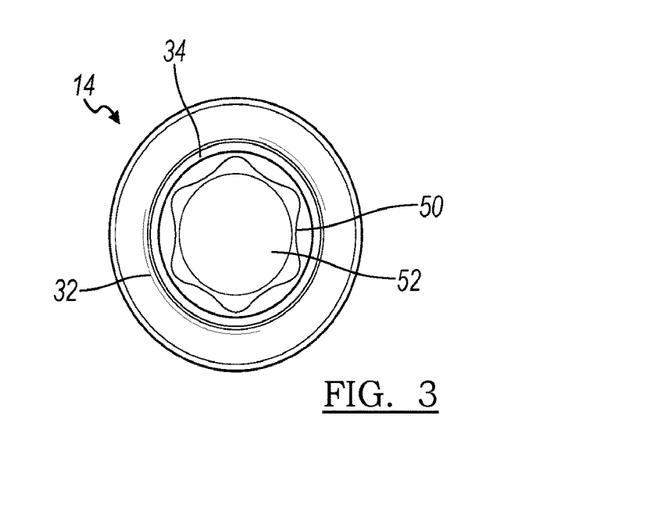
FIG. 3 is a top perspective view of one end of the fastener body of the security fastener assembly in FIG. 1, showing a security drive feature in more detail and disposed inside external threads.
Figure 4A:
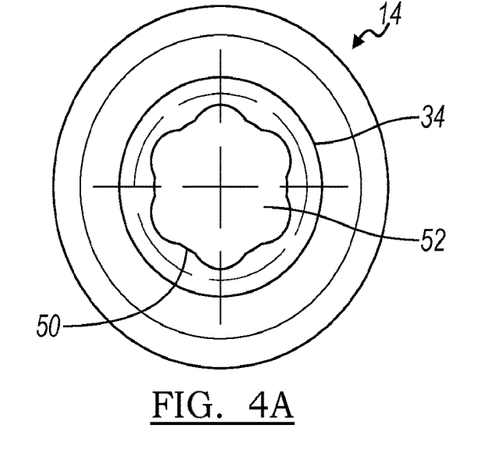
FIG. 4A is a top view of the fastener body in FIG. 3 according to one embodiment.
Figure 4B:
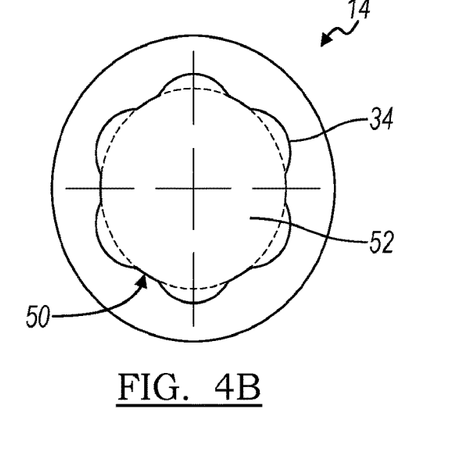
FIG. 4B is a top view of the fastener body in FIG. 3 according to another embodiment.

As shown in FIGS. 1-2, the keyed security feature 50 is concealed when the cap 12 is installed on the fastener body 14. As illustrated in FIGS. 3-5, wherein the keyed security feature 50 is formed internal to the mating attachment portion 32 on the fastener body 14. When the cap 12 is installed on the fastener body 14, the keyed security feature 50 is positioned within the bore 28 of the cap 12 is concealed by the closed cap end 22.

The keyed internal drive 50 has a unique shaped recess 52 that may have different undulating, serpentine, irregular or unique shaped recess, or plurality of recesses that are not able to be gripped by a standard tool to apply enough torque to remove the fastener body 14. For example, FIGS. 4A-4B illustrate two examples of a keyed security feature 50 having a unique shaped recess 52 that will not work to transmit sufficient torque to unseat the fastener body 14 from the vehicle with a standard tool.

As shown in FIG. 8, the enclosed cap end 22 may be enclosed with a cover 54 secured to a cap body 56. The cover 54 may be a stainless-steel cover secured over the cap body 56. One example of a cover covering a cap body is disclosed U.S. patent application Ser. Nos. 14/976,190, 15/144,920 and 16/976,190 by Larry Wilson et al. are hereby incorporated by reference herein.

Figures 9A, 9B:
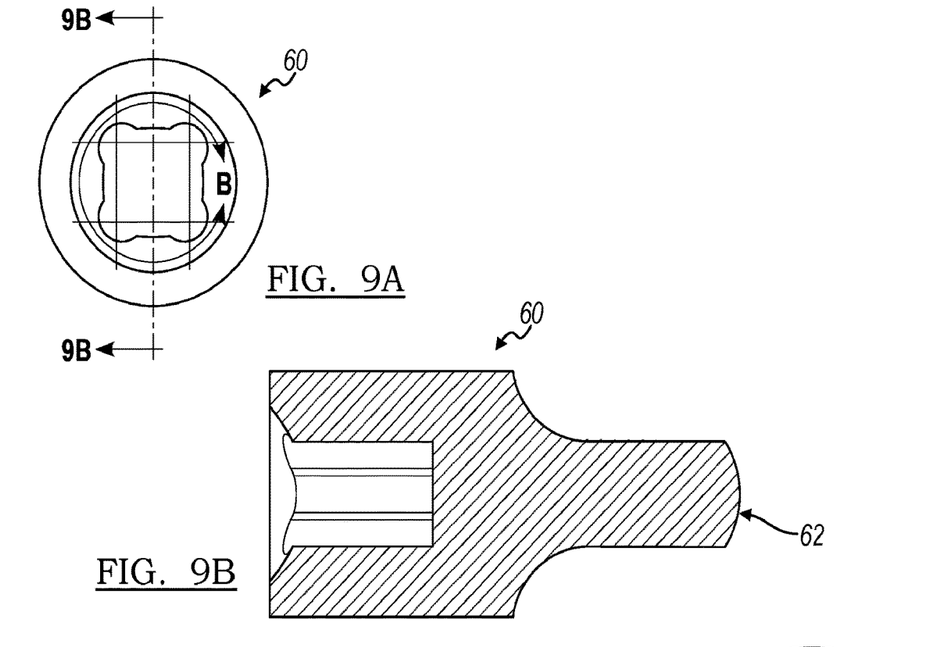
FIG. 9A illustrates a top view a security drive tool.
FIG. 9B illustrates a section view of the security drive tool.
Figure 9C:
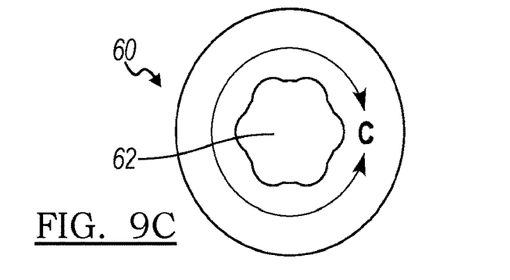
FIG. 9C illustrates a bottom view of the security drive tool.
Figure 10:
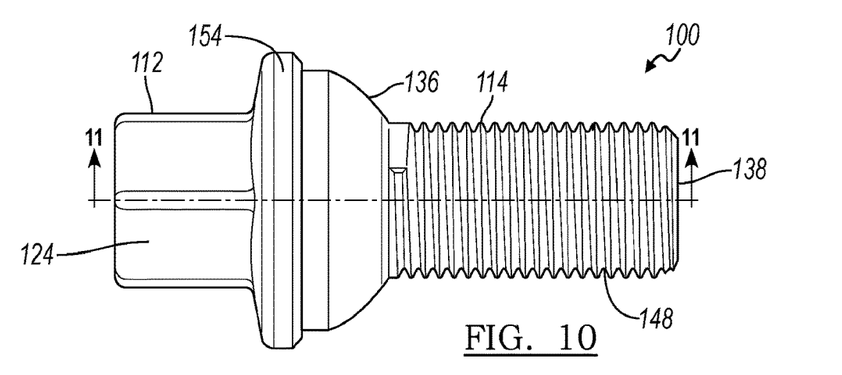
FIG. 10 is a side perspective view of a security fastener assembly having a decorative cap and a fastener body according to one embodiment.
Figure 11:
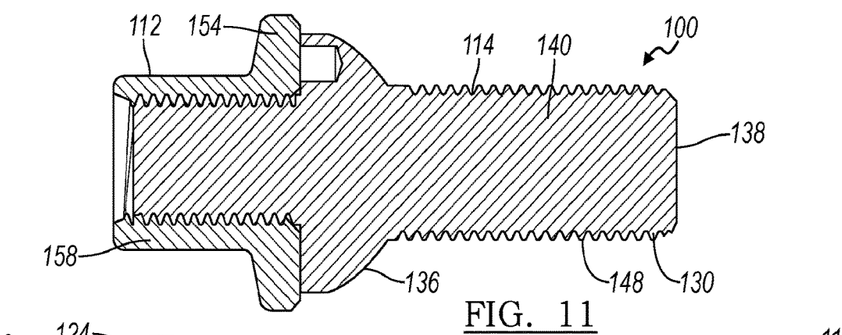
FIG. 11 is a section view of the fastener assembly through section lines 11-11 in FIG. 10.

As shown in FIGS. 9A-9B, the security tool 60 then has a corresponding undulating, serpentine or unique shaped tip 62 to threadedly remove the fastener body 14 from the wheel. For example, the fastener bodies 14 may be manufactured with fifteen or more unique shaped security recesses, and each unique security recess would require a unique tool. A shown in FIG. 9B, the unique tool tip 62 may correspond to the keyed recess 52 as shown in FIG. 4A. Other tools would have a corresponding tool tip based on the security recess shape. A locking security kit for a vehicle may include four fastener assemblies 10 (one fastener assembly 10 for each wheel), where each fastener body 14 has the same unique keyed drive feature 50. The kit would also include one keyed security drive tool 60 with an engagement tip corresponding to the one unique keyed drive in each of the four fastener assemblies 10 of the kit.

The fastener body 14 may only be removed from the wheel with the unique keyed security drive tool 60. The cap 12 may be decoupled and removed from the external threads 44 without loss of fastener joint tension at the bearing surface 36 and ensuring the fastener body 14 continues to remain secured to the vehicle.

Since the fastener assembly 10 is formed of two mating components, the cap 12 and the fastener body 14, the two components may have different material properties or treatments to improve performance as well as appearance. In order to be aesthetically appealing, most aftermarket locking wheel fasteners are chrome plated and have chrome-plated bearing surfaces. A chrome plated bearing surface has an unpredictable coefficient of friction and unpredictable tension/compression and therefore the fastener and bearing surface do not reliably fasten the wheel to the vehicle. The fastener assembly 10 formed of two-components solves this problem, as the fastener body 10 may not be chrome plated and may be organically plated or other suitable surface treatment to meet automaker specifications for torque control and predictable fastening at the bearing surface. The cap 12 may be separately formed to have desired appearance such as stainless steel, chrome plating, or black-chrome plating, or other desired appearance surface treatment. Therefore, the fastener assembly 10 allows for a decorative appearance without a chrome plated bearing surface 36.

Further, most of after-market locking wheel fasteners do not meet automaker's factory specifications for wheel fastener performance, deviating in some or all the requirements for hardness, friction and strength, for example. However, the fastener assembly 10 may have a fastener body 14 formed of materials and treatments to meet the factor hardness, friction and strength requirements.

Additionally, common locking security fasteners are prone to corrosion since the keyed security drive feature is exposed, which in addition to poor appearance can have the effect of hindering removal by making it difficult for the key tools to fit into the corroded or debris-encrusted keyed drive opening. The fastener assembly 10 also provides an advantage over current locking lug nuts since the keyed security drive feature 50 is protected by the cap 12. The keyed security drive feature 50 of the present application provides the advantage that it is only exposed once the cap 12 is removed so the keyed security drive feature 50 is protected from corrosion and debris during normal use.

The cap 12 may also include security electronics to allow the fastener assembly 10 to communicate to the vehicle or other receiver or provide an alarm of any attempted wheel theft. Fastener security electronics for a wheel fastener alarm disclosed in U.S. patent application Ser. Nos. 15/788,204, 16/127,999 and 17/069,649 by David Davis et al., are hereby incorporated by reference herein.

The cap 12 may be used with another fastener body where these is a desire to cover, conceal or protect a keyed drive feature. The threaded engagement between the cap 12 and the fastener body 14 provides a torque flow path and a one-way clutch to drive the fastener body 14 into a seated position meeting precise torque and tension requirements. The internal threads 42 on the cap 12 may be the same handedness as the internal threads 48 on the fastener body 14 so the cap 12 and the fastener body 14 so both twisted in the same direction for installation.

The cap 12 can then be removed without affecting the joint tension of the fastener body 14 and the wheel. In fact, the internal threads 42 of the cap 12 and external threads 44 of the fastener body 14 may not be in tension and have no clamping load. As such, the cap 12 may be removed where the cap internal threads 42 break free of the external threads 44 of the fastener body 14 without affecting the seating of the internal threads 48 of the fastener body 14 to the wheel stud.

The removal torque, or break-away torque, of the cap 12 to the fastener body 14 is less than the break-away torque of the fastener body 14 to the wheel. In one example, the break-away torque of the cap 12 to the fastener body 14 is less than 95% of the break-away torque of the fastener body 14 to the wheel. In one example, the break-away torque of the cap 12 to the fastener body 14 may be 95% to 75% of the break-away torque of the fastener body 14 to the wheel. However, the difference in break-away torque may be any suitable difference while ensuring the cap 12 remains fastened to the fastener body and does not fall off due to vibrations but is easily removed without unseating the fastener body from the wheel.

To enable the cap 12 to be threadedly removed from the fastener body 14 without unseating the fastener body 14 from the vehicle, the cap attachment portion 26 and the mating attachment portion 32 may have a first thread dimension, while the engagement surface 30 may have a second thread dimension. In one embodiment, the threads for the attachment portion 26 and the mating attachment portion 32 may be double-lead threads. The double-lead threads may have two threads being rolled concurrently. The threads on the engagement surface 30 may be single lead.

In one example, the first and second thread dimensions may have different pitch angles. For a single lead thread, the pitch angle and helix angle are equal. For a double lead thread, pitch angle is half the helix angle.

The helix angle of the first thread dimension may be greater than the helix angle of the second thread dimension. When the helix angle of the upper mating attachment portion 32 is greater (i.e. steeper) than the helix angle of the lower engagement surface 30 of the fastener body 14, the torque transferred to the lower engagement surface 30 is increased while the torque to the upper mating attachment portion 32 remains constant. Therefore, the lower engagement surface 30 has more clamping force to the vehicle. Therefore, when the cap 12 is twisted off from the mating attachment portion 32 of the fastener body 12, the cap 12 will come off at a lower break-away torque than the fastener body to the wheel.

For example, the engagement surface 30 of a bolt or wheel nut 14 may have a clamp force of approximately 46.2 KN and break-away torque of approximately 117 Nm when torqued to the standard 140 Nm and have a single-lead with a helix angle of approximately 0.43 radians. Conversely, in one example, the upper mating attachment portion 32 may have a clamp force of approximately 47.2 kN and a break-away torque of approximately 113 Nm a helix angle of approximately 0.08 radians where it is a double-lead thread. Other helix angles and/or thread dimensions are also contemplated to provide a suitable difference in break-away torque between the upper mating attachment portion 32 and the lower engagement surface 30.

In another embodiment, the mating attachment portion 32 may have less bearing surface than the threads of the engagement surface 30. For example, the internal threads 42 of the cap 12 and the external threads 44 of the fastener body 14 may have less bearing surface area compared to the wheel stud and the internal threads 48 of the fastener body 14.

In another embodiment, the mating attachment portion 32 may have a smaller thread diameter than the threads of the engagement surface 30. For example, the attachment portion 26 and the mating attachment portion 32 may be M12×1.5 and the threads of the engagement surface 30 may be M4×1.5.

The fastener body 14 may have a coating for corrosion and friction resistance. To further reduce the break-away torque required to unsecure the cap 12 from the fastener body 14, a friction modifier coating may be applied to the attachment portion 26 on the cap 12 The friction modifier coating may provide a lower coefficient of friction to allow the cap 12 to be removed easier. One example of a friction modifier coating may be a chrome-free, zinc aluminum coating.

FIGS. 10-15 illustrate a decorative security fastener assembly 100 according to another embodiment. The decorative security fastener assembly 100 includes a decorative fastener cap 112 coupled to a security fastener body 114. The fastener assembly 100 can be installed with standard tools, but requires a specific keyed tool to remove.

Figure 12:
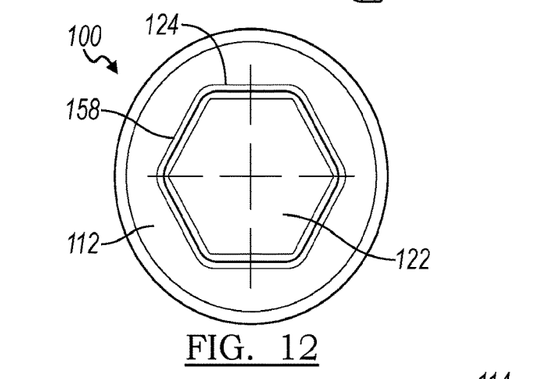
FIG. 12 is a top view of the fastener assembly in FIG. 10 according to one embodiment.
Figure 13:
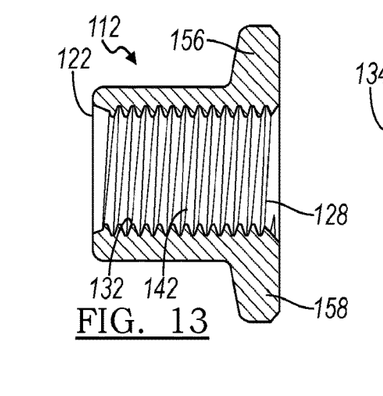
FIG. 13 is a section view of the cap in FIG. 11 with the fastener body removed.

As shown in FIG. 12, the decorative fastener cap 112 may have a hexagonal bearing surface 124, but the bearing surface 124 may have any standard bearing surface common with the other wheel fasteners on the vehicle. As shown the fastener cap 112 has an attachment portion 126 for attaching the cap 112 to the fastener body 114 having internal threads 142 formed in a bore 128 opposite an enclosed cap end 122. In one embodiment, the bore 128 may extend through the entire length of a cap body 158 and a cap end 122 may be enclosed with a cover secured to a cap body 158. For example, the cover may be a stainless-steel cover secured over the cap body 158. One example of a cover covering a cap body is disclosed in U.S. patent application Ser. Nos. 14/976,190, 15/144,920 and 16/976,190 by Larry Wilson et al. and are hereby incorporated by reference herein.

The internal threads 142 on the threaded portion 16 threadedly engage external threads 144 on the fastener body 114. When the internal threads 142 are fully seated on the external threads 144 of the fastener body 114, the cap 112 provides a flow path for torque to the fastener body 114 so the security fastener assembly 100 can be fastened to a vehicle at industry standard torque levels.

Figure 14:
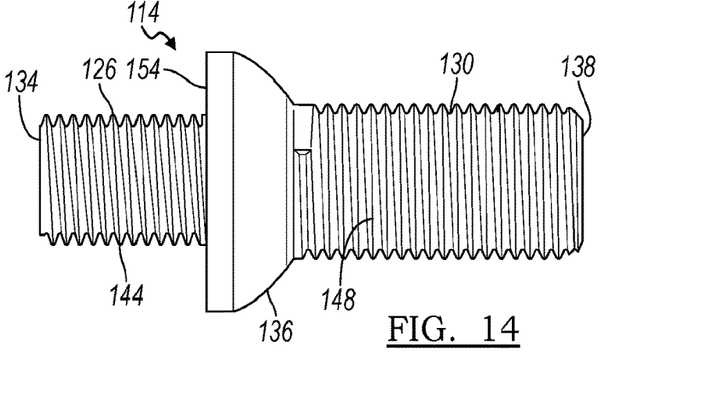
FIG. 14 is a perspective view of the fastener body in FIG. 10 with the cap removed.

As illustrated in FIG. 14, the fastener body 114 may be formed as a bolt where the second end 138 is formed as a bolt body having an engagement surface 130 being a bolt protrusion 140 with external threads 148 to engage a threaded hole. For example, the external threads 148 may engages a wheel's hub, drum brake or disc.

Figure 15:
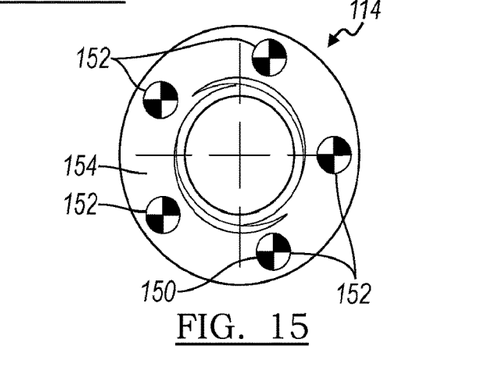
FIG. 15 a top view of the fastener body in FIG. 10 with the cap removed.

If removal of the fastener assembly 100 is attempted, the fastener cap 112 will rotate and unthread from the fastener body 114 revealing a keyed security feature 150. As shown in FIG. 15, the keyed security feature 150 is formed external to the mating attachment portion 126 on the fastener body 114. The keyed security feature 150 may be formed on a ledge 154 surrounding the mating attachment portion 132. As illustrated, the keyed security feature 150 may be formed as a plurality of security recesses 152 formed on the ledge 154. The plurality of recesses 152 may have any suitable shape, number or spacing along the ledge 154. The keyed security recess 152 may be continuous around the mating attachment portion 132 and be an undulating, serpentine or unique shaped recess that are not able to be gripped by a standard tool to apply enough torque to remove the fastener body 114. Once the fastener cap 112 is removed a matching keyed security tool is required to remove the fastener body 114.

The keyed security feature 150 is concealed when the cap 112 is installed on the fastener body 114. When the cap 112 is installed on the fastener body 114, the keyed security feature 150 is concealed by a flange 156 on the cap 112 and covers the keyed security feature 150 on the ledge 154. The flange 156 on the cap 112 may have a generally planar surface that abuts the ledge 154 to conceal the keyed security feature 150 and generally enclose the recesses 152 to prevent debris or corrosion on the security feature 150.

The threaded engagement between the cap 112 and the fastener body 114 provides a torque flow path and a one-way clutch to drive the fastener body 114 into a seated position meeting precise torque and tension requirements. The internal threads 142 on the cap 112 may be the same handedness as the external threads 148 on the fastener body 114 so the cap 112 and the fastener body 114 so both twisted in the same direction for installation.

The mating external threads 144 are formed at a first end 134 of the fastener body 114 and the external threads 148 extend to a second end 138 of the fastener body 114. A tapered, spherical or frustoconical bearing surface 136 may be formed between the first end 134 and the second end 138 opposite the ledge 154. When the external threads 148 are fully seated at standard torque levels, the bearing surface 136 may be compressed and in tension with a corresponding surface to reduce the tendency for the bolt to loosen, thereby maintaining the fastener 100 securely seated.

FIGS. 16-21 illustrate a decorative security fastener assembly 200 according to another embodiment. The decorative security fastener assembly 200 includes a decorative fastener cap 212 coupled to a security fastener body 214. The decorative security fastener assembly 200 can be installed with standard tools but requires a specific keyed tool to remove.

Figure 18:
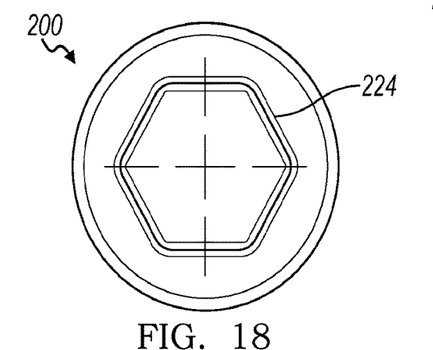
FIG. 18 is a top view of the fastener assembly in FIG. 16 according to one embodiment.
Figure 19:
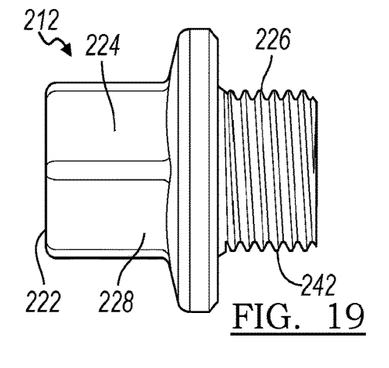
FIG. 19 is a side view of the cap in FIG. 16 with the fastener body removed.

As shown in FIG. 18, the decorative fastener cap 212 may have a hexagonal bearing surface 224. However, the bearing surface 224 may have any standard bearing surface common with the other wheel fasteners on the vehicle. As shown in FIG. 19, the fastener cap 212 has an attachment portion 226 for attaching the cap 212 to the fastener body 214 having external threads 242 protruding from a cap body 228 being solid. The attachment portion 226 extends opposite an enclosed cap end 222.

The external threads 242 on threadedly engage internal threads 244 formed in a bore 246 on the fastener body 214. When the external threads 242 are fully seated in the internal threads 244 of the fastener body 214, the cap 212 provides a flow path for torque to the fastener body 214 so the security fastener assembly 200 can be fastened to a vehicle at industry standard torque levels.

Figure 20:
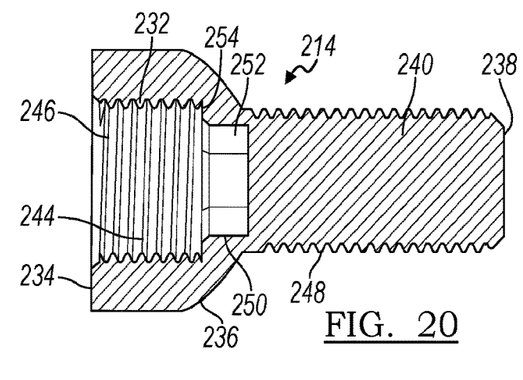
FIG. 20 is a section view of the fastener body in FIG. 17 with the cap removed.
Figure 21:
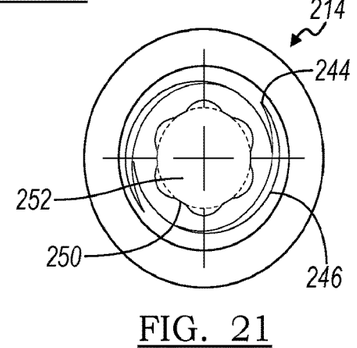
FIG. 21 a top view of the fastener body in FIG. 16 with the cap removed.
Figure 22:
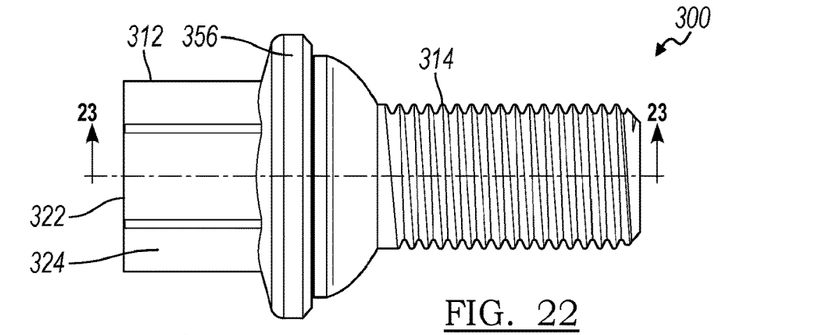
FIG. 22 is a side perspective view of a security fastener assembly having a decorative cap and a fastener body according to one embodiment.

As illustrated in FIG. 20, the fastener body 214 may be formed as a bolt where the second end 238 has a protrusion 240 with external threads 248 to engage a threaded hole. For example, the external threads 248 may engages a wheel's hub, drum brake or disc.

If removal of the fastener assembly 200 is attempted, the fastener cap 212 will rotate and unthread from the fastener body 214 revealing a keyed security feature 250. As shown in FIG. 20, the keyed security feature 250 is formed internal to the mating attachment portion 232 on the fastener body 214. The keyed security feature 250 may be formed within a bottom floor 254 of the bore 246. As illustrated, the keyed security feature 250 may be a recess 252. The recess 252 may have any suitable shape or may be formed by a plurality of recesses. The keyed security recess 252 may be an undulating, serpentine or unique shaped recess that is not able to be gripped by a standard tool to apply enough torque to remove the fastener body 214. Once the fastener cap 212 is removed, the matching keyed security tool is required to remove the fastener body 214.

Figure 16:
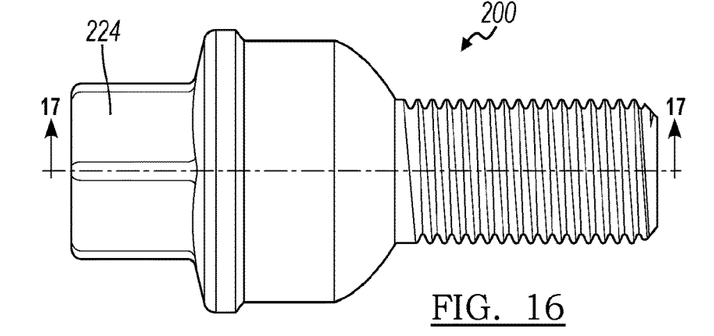
FIG. 16 is a side perspective view of a security fastener assembly having a decorative cap and a fastener body according to one embodiment.
Figure 17:
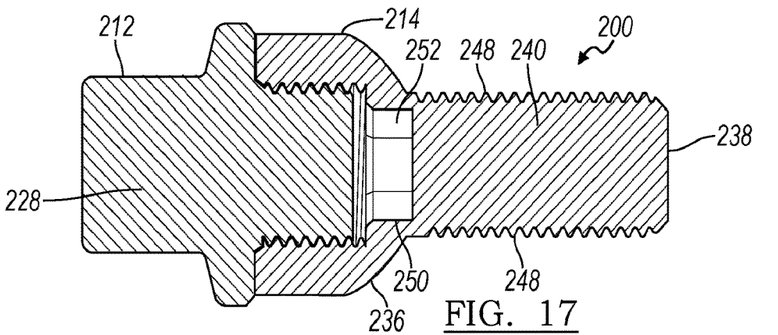
FIG. 17 is a section view of the fastener assembly through section lines 17-17 in FIG. 16.

As shown in FIGS. 16-18, the keyed security feature 250 is concealed when the cap 212 is installed on the fastener body 214. When the cap 212 is installed on the fastener body 214, the cap 212 covers the keyed security feature 250 in the floor 254 of the bore 246.

The mating internal threads 244 extend into the bore 246 from a first end 234 of the fastener body 214 and the external threads 248 extend to a second end 238 of the fastener body 214. A tapered, spherical or frustoconical bearing surface 236 may be formed between the first end 234 and the second end 238. When the external threads 248 are fully seated at standard torque levels, the bearing surface 236 may be compressed and in tension with a corresponding surface to reduce the tendency for the bolt to loosen, thereby maintaining the fastener 200 securely seated.

The threaded engagement between the cap 212 and the fastener body 214 provides a torque flow path and a one-way clutch to drive the fastener body 214 into a seated position meeting precise torque and tension requirements. The external threads 242 on the cap 212 may be the same handedness as the external threads 248 on the fastener body 214 so the cap 212 and the fastener body 214 so both twisted in the same direction for installation.

FIGS. 22-27 illustrate a decorative security fastener assembly 300 according to another embodiment. The decorative security fastener assembly 300 includes a decorative fastener cap 312 coupled to a security fastener body 314. The fastener assembly 300 has the aesthetic appearance of a standard fastener but requires a specific keyed tool to remove.

Figure 24:
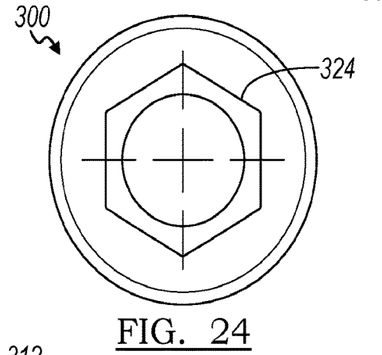
FIG. 24 is a top view of the fastener assembly in FIG. 22 according to one embodiment.
Figure 25:
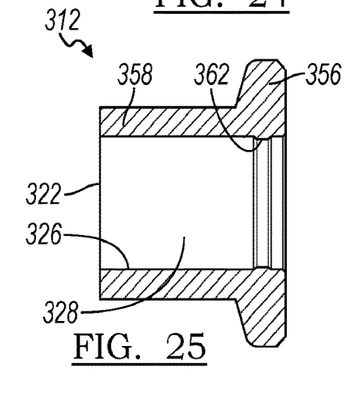
FIG. 25 is a section view of the cap in FIG. 23 with the fastener body removed.
Figure 26:
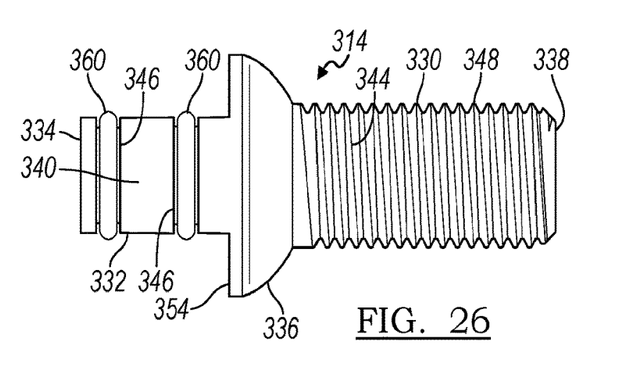
FIG. 26 is a perspective view of the fastener body in FIG. 22 with the cap removed.

As shown in FIG. 24, the decorative fastener cap 312 may have a hexagonal bearing surface 324, but the bearing surface 324 may have any standard bearing surface common with the other wheel fasteners on the vehicle. As shown in FIG. 25 the fastener cap 312 has an attachment portion 326 for attaching the cap 312 to the fastener body 314. The attachment portion 326 is an internal bore 328 opposite an enclosed cap end 322, for receiving the mating attachment portion 332 on the fastener body 314. The mating attachment portion 332 of the fastener body 314 is pushed into the attachment portion 326 in the cap 312. The mating attachment portion 332 of the fastener body 314 is retained in the attachment portion 326 of the cap 312 with an interference fit. In one embodiment, the bore 328 may extend through the entire length of a cap body 358 and a cap end 322 may be enclosed with a cover secured to a cap body 358. For example, the cover may be a stainless-steel cover secured over the cap body 358. One example of a cover covering a cap body is disclosed in U.S. patent application Ser. Nos. 14/976,190, 15/144,920 and 16/976,190 by Larry Wilson et al. and are hereby incorporated by reference herein.

The mating attachment portion 332 has a protrusion 344 extending from the fastener ledge 354 to define the first end 334 of the fastener body 314. The second end 338 of the fastener body 314 defines the engagement surface 330 being a bolt with external threads 348. In another embodiment, the second end 338 of the fastener body 314 may be formed as nut body is having an engagement surface with internal threads.

Figure 23:
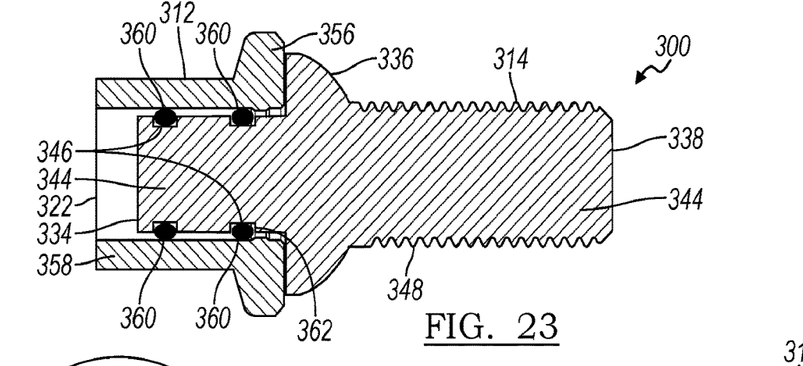
FIG. 23 is a section view of the fastener assembly through section lines 23-23 in FIG. 22.

The mating attachment portion 332 has at least one annular groove 346 formed around the protrusion 344. As shown, two annular grooves 346 are formed along the protrusion 344. The annular grooves 346 are each sized to retain an elastomeric ring 360, such as an O-ring. The outer diameter of the elastomeric ring 360 is larger than the inner diameter of the internal bore 328 and is compressed as the mating attachment portion 332 is pushed into the cap 312 creating the interference fit.

The attachment portion 326 of the cap 312 also has at least one annular ridge 362 that extends into the bore 328. As the elastomeric ring 360 is pushed past the ridge 362, the elastomeric ring 360 compresses further, creating a snap-fit that provides additional retention and prevents the fastener body 314 from being pulled out of the cap 312.

Figure 27:
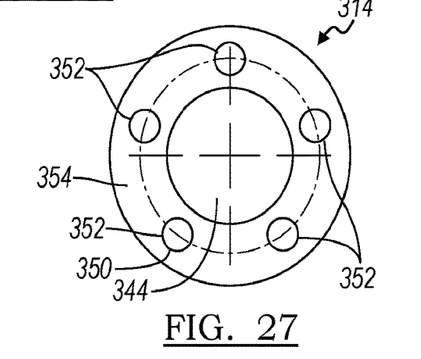
FIG. 27 a top view of the fastener body in FIG. 10 with the cap removed.

If removal of the fastener assembly 300 is attempted by rotating the fastener cap 312, the cap 312 may twist and rotate, but the fastener assembly 300 will not be removed. Pulling the fastener cap 312 off the fastener body 314 reveals a keyed security feature 350. As shown in FIG. 27, the keyed security feature 350 is formed external to the mating attachment portion 332 on the fastener body 314.

The keyed security feature 350 may be formed on the ledge 354 surrounding the mating attachment portion 332. As illustrated in FIG. 27, the keyed security feature 150 may be formed as a plurality of security recesses 352 formed on the ledge 354. The plurality of recesses 352 may have any suitable shape, number or spacing along the ledge 354. The keyed security recess 352 may be continuous around the mating attachment portion 332 and be an undulating, serpentine or unique shaped recess that are not able to be gripped by a standard tool to apply enough torque to remove the fastener body 314. Once the fastener cap 312 is removed a matching keyed security tool is required to rotate and threadedly remove the fastener body 314. The keyed security tool may also be used to install the fastener body 314 before pushing on the cap 312.

The keyed security feature 350 is concealed when the cap 312 is installed on the fastener body 314. When the cap 312 is installed on the fastener body 314, the keyed security feature 350 is concealed by a flange 356 on the cap 312 and covers the keyed security feature 350 on the ledge 354. The flange 356 on the cap 312 may have a generally planar surface that abut the ledge 354 to conceal the keyed security feature 350.

The engagement portion 330 of the fastener body 314 has external threads 348 extending to the second end 338 of the fastener body 314. A tapered or frustoconical bearing surface 336 is formed between the first end 334 and the second end 338 opposite the ledge 354. When the external threads 348 are fully seated at standard torque levels, the bearing surface 336 may be compressed and in tension with a corresponding surface to reduce the tendency for the bolt to loosen, thereby maintaining the fastener 300 securely seated. The bearing surface 336 may be a tapered, spherical or frustoconical or other suitably shaped bearing surface 336 formed between the first end 334 and the second end 338.

The cap 312 can then be removed without affecting the joint tension of the fastener body 314 and the vehicle. The cap 312 is removed in a linear direction parallel to the central axis of the fastener body about which the fastener body 314 rotates which being threadedly engaged. As such, the cap 312 may be removed without affecting the seating of the external threads 348 of the fastener body 314 to the vehicle. Similarly, the cap 312 may be rotated or twisted on the elastomeric rings where the frictional forces of twisting the cap 312 about the elastomeric rings 360 is less than the break-away torque of the engagement portion 330 of the fastener body.

FIGS. 28-31 illustrate a decorative security fastener assembly 400 according to another embodiment. The decorative security fastener assembly 400 includes a decorative fastener cap 412 coupled to a security fastener body 414. The cap 414 has the aesthetic appearance of a standard fastener, but the fastener body 414 requires a specific keyed tool to remove.

Figure 28:
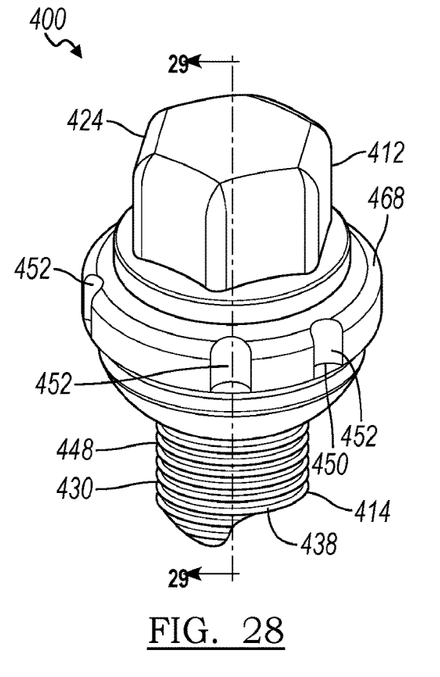
FIG. 28 is a side perspective view of a security fastener assembly having a decorative cap and a fastener body according to one embodiment.
Figure 29:
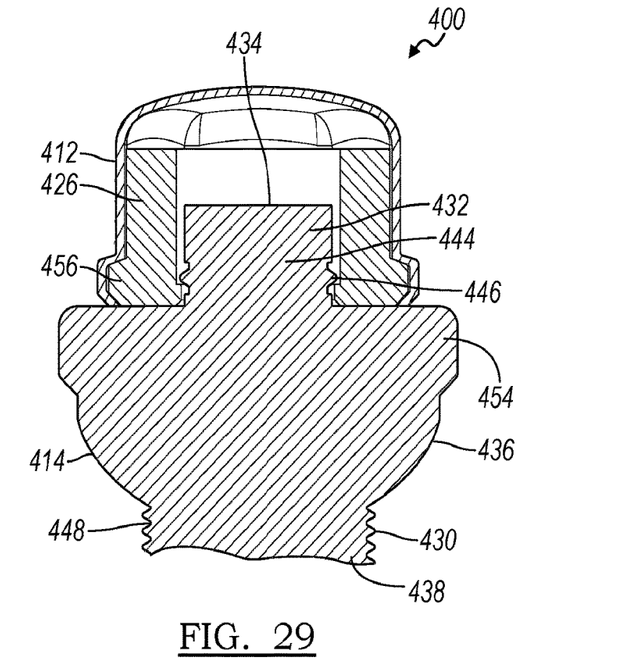
FIG. 29 is a section view of the fastener assembly through section lines 29-29 in FIG. 28.

As shown in FIG. 28, the decorative fastener cap 412 may have a hexagonal bearing surface 424, but the bearing surface 424 may have any standard bearing surface common with the other wheel fasteners on the vehicle. As shown in FIG. 29 the fastener cap 412 has an attachment portion 426 for attaching the cap 412 to the fastener body 414. The attachment portion 426 is an internal bore 428 opposite a cap end 422 for receiving the mating attachment portion 432 on the fastener body 414. The mating attachment portion 432 of the fastener body 414 is pushed into the attachment portion 426 in the cap 412. The mating attachment portion 432 of the fastener body 414 is retained in the attachment portion 426 of the cap 412 with an interference fit.

The mating attachment portion 432 has a protrusion 444 extending from the fastener ledge 454 to define the first end 434 of the fastener body 414. The second end 438 of the fastener body 414 defines an engagement surface 430 being a bolt with external threads 448. In another embodiment, the second end 438 of the fastener body 414 may be formed as nut body is having an engagement surface 430 with internal threads.

Figure 31:
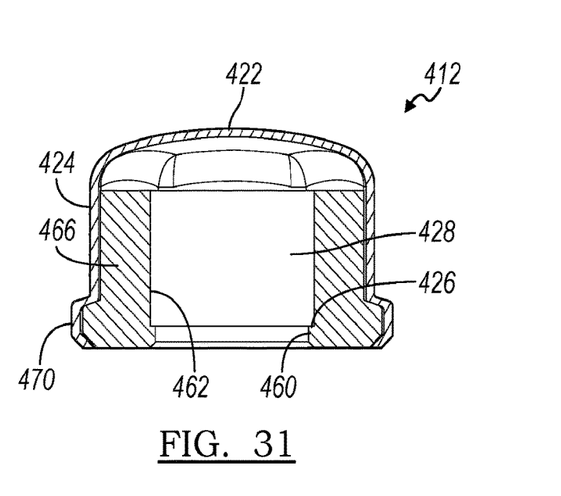
FIG. 31 is a section view of the cap in FIG. 29 with the fastener body removed.

As shown in FIG. 31, the attachment portion 426 of the cap 412 defines the bore 428 with a first opening 460 having a diameter less than a second bore opening 462. The inner cap body 466 may be formed of plastic. The inner cap body 466 may be formed of a polymer, or other suitable elastically deformable material. The inner cap body 466 is covered in a metallic cover 470 or layer so that the cap 412 as the aesthetic appearance of the other fasteners. For example, the cap 112 may have a metal cover, such as a stainless-steel cover as disclosed in U.S. patent application Ser. No. 13/766,199 by Sean K. Milligan the disclosures of which is hereby incorporated by reference herein. The inner cap body 466 and cover 470 may also have a flange 456, as shown in FIG. 29.

As shown in FIG. 29, the mating attachment portion 432 has at least one annular rib 446 formed around the protrusion 444. The annular rib 446 has an outer diameter larger than the inner diameter of the first opening 460 of the internal bore 428. As the mating attachment portion 432 is pushed into the bore 428 formed in the inner cap body 466, the annular rib 446 causes the first opening 460 to elastically deform. The annular rib 446 is pushed into the second bore opening 462 creating a snap-fit that retains and prevents the fastener body 414 from being pulled out of the cap 412. Alternatively, the attachment portion 326 of the cap 312 may also have at least one annular ridge that extends into the bore 428. As the annular rib 446 is pushed past the ridge, the elastomeric ring 360 compresses further, creating a snap-fit that provides additional retention and prevents the fastener body 414 from being pulled out of the cap 412.

Figure 30:
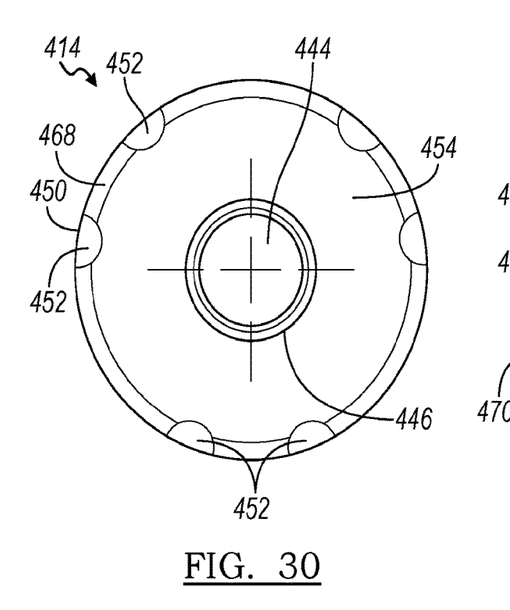
FIG. 30 a top view of the fastener body in FIG. 28 with the cap removed.

The outer diameter of annular rib 446 may be less than the inner diameter of the second bore opening 462, allowing the cap 412 to spin freely about the protrusion 444. If removal of the fastener assembly 400 is attempted by rotating the fastener cap 412, the cap 412 may freely twist and rotate, but the fastener assembly 400 will not be removed. As shown in FIGS. 28 and 30, the keyed security feature 450 may be formed along on the fastener body 414 along the periphery 468 of the ledge 454.

When the external threads 448 are fully seated at standard torque levels, the bearing surface 436 may be compressed and in tension with a corresponding surface to reduce the tendency for the bolt to loosen, thereby maintaining the fastener 400 securely seated. The bearing surface 436 may be a tapered, spherical or frustoconical or other suitably shaped bearing surface 436 formed between the first end 434 and the second end 438.

The keyed security feature 450 may be formed on a ledge 454 surrounding the mating attachment portion 432. As illustrated in FIGS. 28 and 30, the keyed security feature 450 may be formed as a plurality of security notches 452 formed along the periphery 468 of the ledge 454. The plurality of notches 452 may have any suitable shape, number or spacing along the ledge 454. The keyed security notches 452 may also form an undulating, serpentine or unique shaped periphery that is not able to be gripped by a standard tool to apply enough torque to remove the fastener body 414. The keyed security feature 450 may be formed on the ledge 454 adjacent the bearing surface 436 so that the security notches 452 along the periphery 468 extend to the bearing surface 436.

A matching keyed security tool is required to rotate and threadedly remove the fastener body 414. The keyed security tool may also be used to install the fastener body 414. In another embodiment, pulling the fastener cap 412 off the fastener body 414 may reveal a keyed security feature on the ledge 454, as discussed above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A security fastener assembly comprising:
    a cap having a metallic cap body with a tool bearing surface and a threaded attachment portion formed opposite the tool bearing surface;
    a fastener body having a mating threaded attachment portion and tapered bearing surface integrally formed at a first end along which the cap is secured, and a keyed security feature formed adjacent the mating threaded attachment portion, wherein a second end of the fastener body has a threaded engagement portion for securing the security fastener assembly to a vehicle,
    wherein the fastener body has a first thread dimension of the mating threaded attachment portion being different than a second thread dimension of the threaded engagement portion, wherein a first break-away torque between the cap and the fastener body based on the first thread dimension is less than a second break-away torque between the fastener body and the vehicle based on the second thread dimension,
    wherein the mating threaded attachment portion of the fastener body is installed with rotation in a first direction by a standard tool contacting the tool bearing surface of the cap thereby rotating the cap and fastener body in the first direction, and
    wherein engaging the tool bearing surface of the cap and rotating in a second direction opposite the first direction does not rotate the mating threaded attachment portion of the fastener body, and
    wherein the fastener body is removable with the keyed security feature.

2. The security fastener assembly of claim 1, wherein the keyed security feature comprises at least one recess having a unique security shape being inoperable with standard tools.

3. The security fastener assembly of claim 1, wherein the first thread dimension has first helix angle being different than a second helix angle of the second thread dimension such that a first break-away torque between the cap and the fastener body is less than the second break-away torque between the fastener body and the vehicle.

4. The security fastener assembly of claim 1, wherein at least one of the threaded attachment portion on the cap or the mating threaded attachment portion on the fastener body has a friction modifier coating to reduce the first break-away torque between the cap and the fastener body.

5. A security fastener assembly comprising:
    a cap having a metallic cap body with a tool bearing surface and an attachment portion formed opposite the tool bearing surface;
    a fastener body having a mating attachment portion formed at a first end along which the cap is secured and a keyed security feature formed adjacent the mating attachment portion, wherein a second end of the fastener body has a threaded fastener portion for securing the security fastener assembly to a vehicle,
    wherein the threaded fastener portion of the fastener body is installed with rotation in a first direction, and wherein engaging the tool bearing surface of the cap and rotating in a second direction opposite the first direction does not rotate the threaded fastener portion of the fastener body, and
    wherein the fastener body is removable with the keyed security feature,
    wherein the attachment portion of the cap comprises an internal bore and wherein the mating attachment portion on the fastener body has a protrusion, wherein the protrusion is inserted into the internal bore,
    wherein the cap freely spins about the protrusion while the cap is retained on the fastener body.

6. The security fastener assembly of claim 5, wherein the protrusion is pushed into the internal bore so the cap is retained on the fastener body with an interference fit.

7. The security fastener assembly of claim 6, wherein a cap body is formed of plastic, wherein the internal bore elastically deforms as the mating attachment portion is pushed into the internal bore so the cap is retained on the fastener body with an interference fit.

8. The security fastener assembly of claim 7, wherein the protrusion has an annular rib, and wherein the internal bore has a first opening being less than a second opening, wherein the first opening elastically deforms as the annular rib is pushed into the internal bore so the cap is retained on the fastener body with a snap fit.

9. The security fastener assembly of claim 5, wherein the mating attachment portion further comprises at least one elastomeric ring, wherein the elastomeric ring is compressed upon insertion into the internal bore so the cap is retained on the fastener body with an interference fit.

10. The security fastener assembly of claim 9, wherein the internal bore has an annular ridge, wherein the elastomeric ring engages the annular ridge with a snap-fit.

11. The security fastener assembly of claim 5, wherein the keyed security feature comprises at least one recess having a unique security shape being inoperable with standard tools.

12. The security fastener assembly of claim 11, wherein the keyed security feature is formed internal to the mating attachment portion on the fastener body.

13. The security fastener assembly of claim 11, wherein the keyed security feature is formed external to the mating attachment portion on the fastener body.

14. A security fastener kit comprising:
a security fastener assembly of claim 5; and
a security drive tool having a tool bearing tip shaped to engage the keyed security feature for removing the fastener body from the vehicle.

15. A security fastener assembly comprising:
a cap having a metallic cap body with a standard tool bearing surface and an attachment portion formed opposite the tool bearing surface;
a fastener body having a mating attachment portion formed at a first end along which the cap is secured and a keyed security recess formed adjacent the mating attachment portion, wherein a second end of the fastener body has a threaded fastener portion for securing the security fastener assembly to a vehicle, wherein the keyed security recess has a unique security shape being inoperable with standard tools,
wherein the threaded fastener portion of the fastener body is installed with rotation in a first direction, and wherein engaging the tool bearing surface of the cap and rotating in a second direction opposite the first direction does not rotate the threaded fastener portion of the fastener body, and
wherein the fastener body is removable with the keyed security recess.

16. The security fastener assembly of claim 15, wherein the keyed security recess is formed internal to the mating attachment portion on the fastener body.

17. The security fastener assembly of claim 15, wherein the keyed security recess is formed external to the mating attachment portion on the fastener body.

18. The security fastener assembly of claim 15, wherein the keyed security recess is concealed by the cap when the cap is attached to the fastener body.

19. The security fastener assembly of claim 15, wherein the keyed security recess is formed along a periphery of the fastener body.

20. The security fastener assembly of claim 15, wherein the keyed security recess extends from a ledge to a bearing surface adjacent the threaded fastener portion.

* * * * *